(12) United States Patent
Guo et al.

(10) Patent No.: US 11,332,265 B2
(45) Date of Patent: May 17, 2022

(54) CHARGER AND PORTABLE DEVICE FOR UNMANNED AERIAL VEHICLE

(71) Applicant: SZ DJI TECHNOLOGY CO., LTD., Shenzhen (CN)

(72) Inventors: Xiaokai Guo, Shenzhen (CN); Hongxiang Qu, Shenzhen (CN); Tao Peng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 269 days.

(21) Appl. No.: 16/595,078

(22) Filed: Oct. 7, 2019

(65) Prior Publication Data
US 2020/0031498 A1 Jan. 30, 2020

Related U.S. Application Data

(63) Continuation of application No. PCT/CN2017/080475, filed on Apr. 13, 2017.

(51) Int. Cl.
*B64F 3/00* (2006.01)
*B64F 5/60* (2017.01)
(Continued)

(52) U.S. Cl.
CPC ............... *B64F 3/00* (2013.01); *B60L 50/60* (2019.02); *B60L 50/66* (2019.02); *B60L 53/16* (2019.02);
(Continued)

(58) Field of Classification Search
CPC ...... B64F 3/00; B64F 5/60; B64F 5/40; B60L 53/51; B60L 50/66; B60L 53/62
(Continued)

(56) References Cited

U.S. PATENT DOCUMENTS

2014/0032034 A1* 1/2014 Raptopoulos ........ G05D 1/0088
701/25
2015/0123462 A1 5/2015 Kamradt
(Continued)

FOREIGN PATENT DOCUMENTS

CN 1079079 A 12/1993
CN 105416597 A 3/2016
(Continued)

OTHER PUBLICATIONS

The World Intellectual Property Organization (WIPO) International Search Report for PCT/CN2017/080475 dated Jan. 17, 2018 6 pages.

*Primary Examiner* — Richard V Muralidar
(74) *Attorney, Agent, or Firm* — Anova Law Group, PLLC

(57) ABSTRACT

A portable device for holding and carrying an unmanned aerial vehicle ("UAV") includes a body. The body includes a first holding member configured to hold the UAV and having a shape matching a shape of the UAV. The portable device also includes a charging board disposed in the body. The portable device also includes a first charging station disposed in the first holding member and configured to electrically connect with the charging board for charging the UAV. The portable device further includes at least one second charging station disposed on the body and configured to electrically connect with the charging board for charging at least one battery.

24 Claims, 6 Drawing Sheets

(51) Int. Cl.
*B64F 5/40* (2017.01)
*B60L 53/51* (2019.01)
*B60L 50/60* (2019.01)
*B60L 53/62* (2019.01)
*H02J 7/00* (2006.01)
*B60L 53/30* (2019.01)
*B60L 53/16* (2019.01)
*B64C 39/02* (2006.01)
*B64D 27/24* (2006.01)
*B64F 1/00* (2006.01)
*B64F 1/36* (2017.01)
*B60L 53/57* (2019.01)

(52) U.S. Cl.
CPC .............. *B60L 53/305* (2019.02); *B60L 53/51* (2019.02); *B60L 53/57* (2019.02); *B60L 53/62* (2019.02); *B64C 39/024* (2013.01); *B64D 27/24* (2013.01); *B64F 1/005* (2013.01); *B64F 1/364* (2013.01); *B64F 5/40* (2017.01); *B64F 5/60* (2017.01); *H02J 7/00* (2013.01); *H02J 7/0042* (2013.01); *B60L 2200/10* (2013.01); *B64C 2201/042* (2013.01); *B64C 2201/201* (2013.01)

(58) Field of Classification Search
USPC .................................................. 320/113, 115
See application file for complete search history.

(56) References Cited

U.S. PATENT DOCUMENTS

| | | | |
|---|---|---|---|
| 2016/0001883 | A1* | 1/2016 | Sanz ..................... H02J 7/0044 |
| | | | 244/17.23 |
| 2016/0334785 | A1* | 11/2016 | Morrison ................ A63H 30/04 |
| 2017/0050749 | A1* | 2/2017 | Pilskalns ................. B60L 53/36 |
| 2017/0283090 | A1* | 10/2017 | Miller ..................... B60L 53/80 |
| 2018/0105058 | A1* | 4/2018 | Symanow ............... B60L 58/20 |

FOREIGN PATENT DOCUMENTS

| | | |
|---|---|---|
| CN | 105490353 A | 4/2016 |
| CN | 205311917 U | 6/2016 |
| CN | 106160085 A | 11/2016 |
| CN | 205863948 U | 1/2017 |
| CN | 205960716 U | 2/2017 |
| CN | 106505703 A | 3/2017 |
| DE | 102013004881 A1 | 9/2014 |
| WO | 2016059555 A1 | 4/2016 |

\* cited by examiner

CHARGER AND PORTABLE DEVICE FOR UNMANNED AERIAL VEHICLE

CROSS-REFERENCE TO RELATED APPLICATION

This application is a continuation application of International Application No. PCT/CN2017/080475, filed on Apr. 13, 2017, the entire contents of which are incorporated herein by reference.

TECHNICAL FIELD

The present disclosure relates to the technology field of electrical chargers and, more particularly, to a charger and a portable device for unmanned aerial vehicles.

BACKGROUND

Batteries are widely used in various devices of multiple technology areas as power supplies. Battery-powered devices may include, for example, handheld gimbal, handheld camera and/or camcorder, unmanned aerial vehicle ("UAV"), robot, etc. Batteries may provide power to such devices for continuous operations, such that these devices may be wirelessly controlled in certain implementations.

In the following descriptions, UAVs are used as example devices. Due to the limit on the electrical power storage capacity of the battery, the continuous flight time for the UAV is also limited. If a UAV is to be operated for a long time, multiple batteries may be used as replacements. In current technologies, to maintain a fully charged state in an unused battery such that the battery may be readily used to power the UAV, a battery charging base may be used to charge and manage multiple batteries. However, a conventional battery charging base can only charge the batteries. That is, the function provided by the conventional battery charging base is simple. Thus, the conventional battery charging base becomes a trivial product that is easily forgotten by the user.

SUMMARY

In accordance with an aspect of the present disclosure, there is provided a portable device for holding and carrying an unmanned aerial vehicle ("UAV") includes a body. The body includes a first holding member configured to hold the UAV and having a shape matching a shape of the UAV. The portable device also includes a charging board disposed in the body. The portable device also includes a first charging station disposed in the first holding member and configured to electrically connect with the charging board for charging the UAV. The portable device further includes at least one second charging station disposed on the body and configured to electrically connect with the charging board for charging at least one battery.

Various embodiments of the present disclosure have the following advantages: the present disclosure provides a charger and a portable device including the charger for a UAV. The charger includes multiple charging stations configured to charge batteries of the UAV. A holding member is provided on a body of the charger, which fits with the shape of the UAV, such that the UAV may be mounted on the charger. Such designs provide convenience for the charging and the transportation of the UAV.

It is understood that the above general descriptions and the following detailed descriptions are illustrative and explanatory, and are not intended to limit the scope of the present disclosure.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The term "communicatively couple(d)" or "communicatively connect(ed)" indicates that related items are coupled or connected through a communication chancel, such as a wired or wireless communication channel.

The following descriptions explain some embodiments of the present disclosure with reference to the drawings. Unless there is an explicit conflict, the following embodiments and features disclosed in the following embodiments may be combined in any suitable manner, and are not mutually exclusive.

Figure 1:
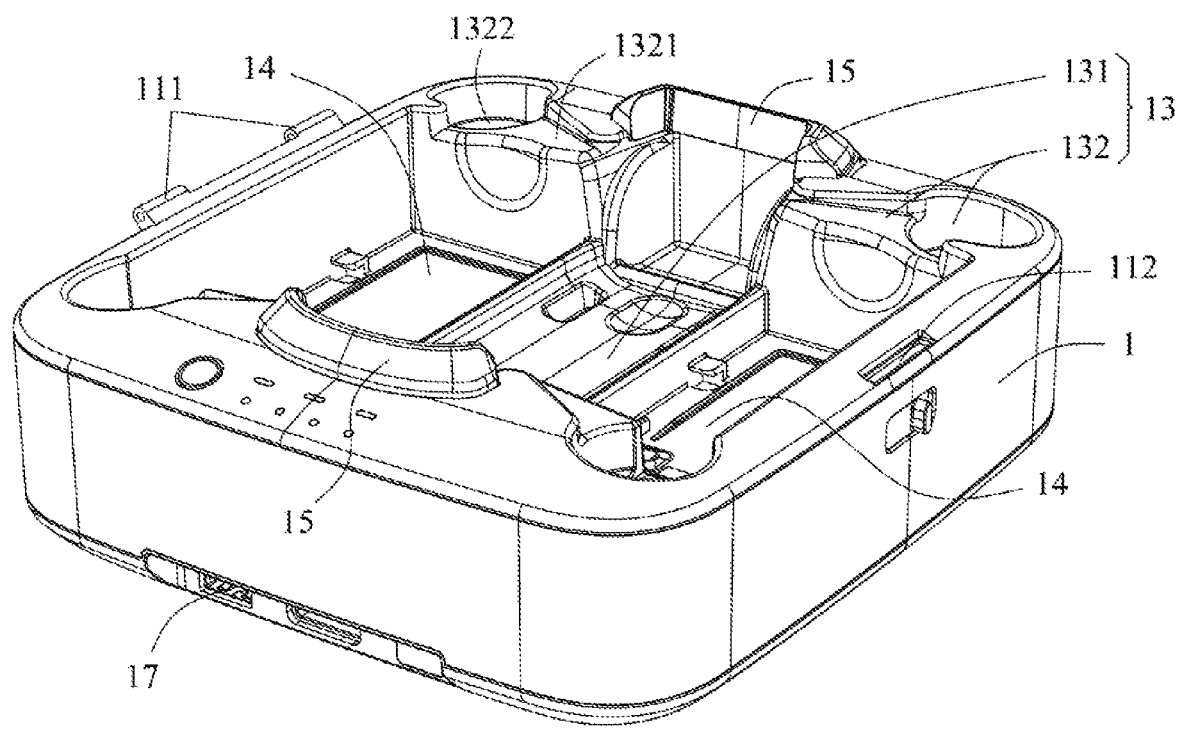
FIG. 1 is a perspective view of a charger from a first perspective, according to an example embodiment.
Figure 2:
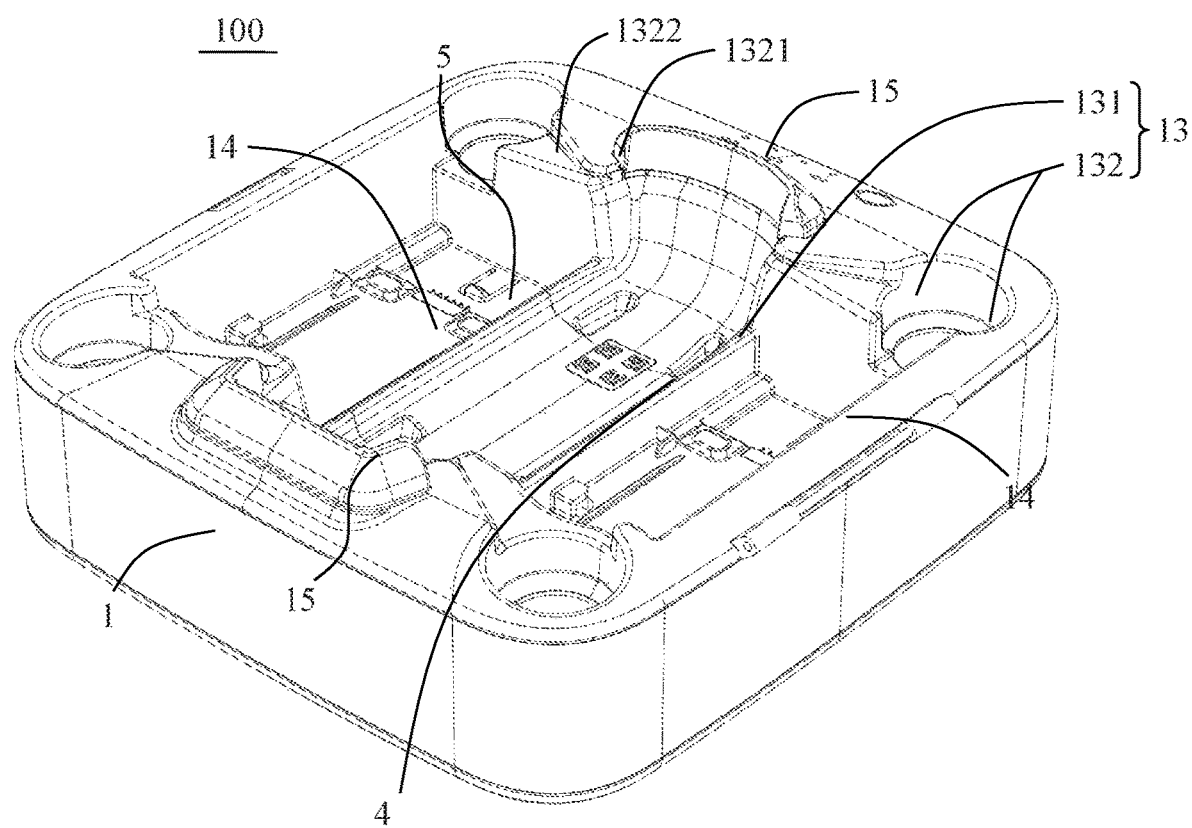
FIG. 2 is a perspective view of a charger from a second perspective, according to an example embodiment.
Figure 3:
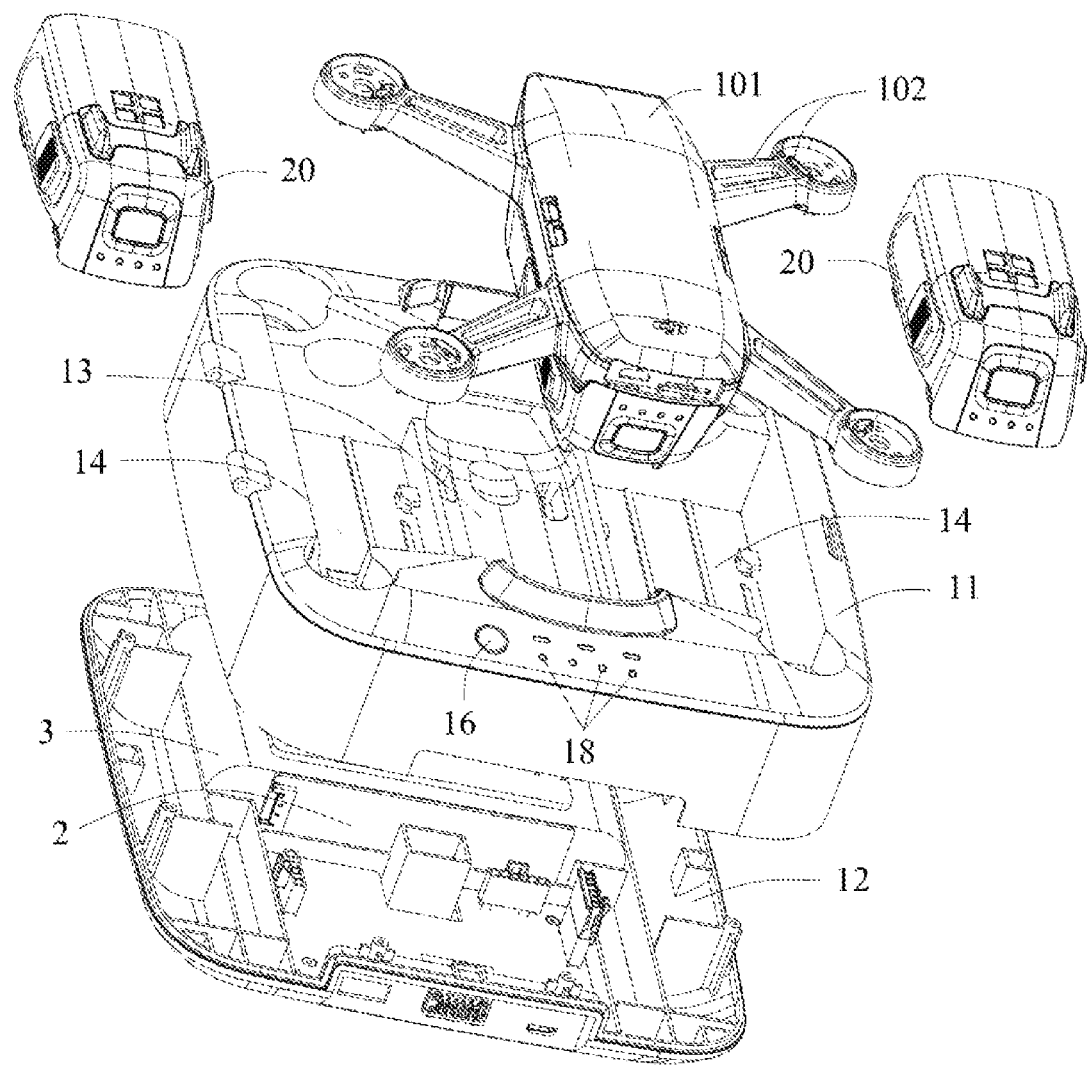
FIG. 3 is an exploded view of a charger with batteries and a UAV, according to an example embodiment.
Figure 4:
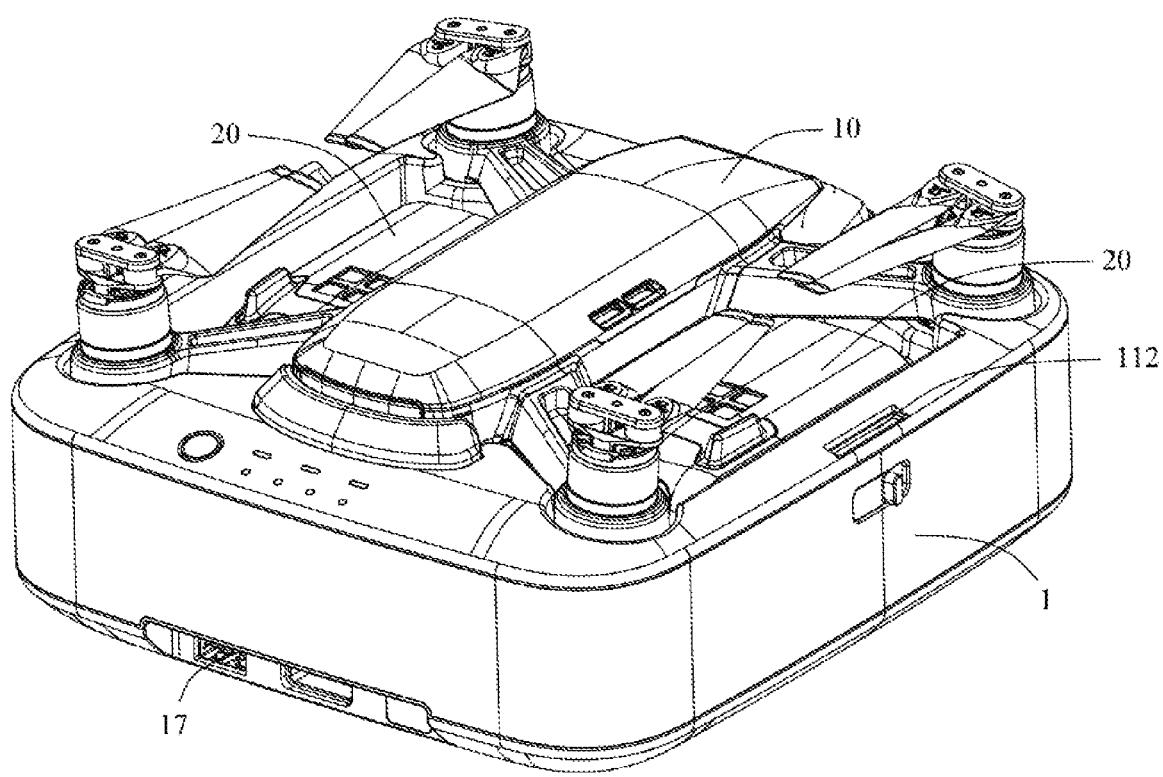
FIG. 4 is an assembled view of the charger with the batteries and the UAV, according to an example embodiment.
Figure 5:
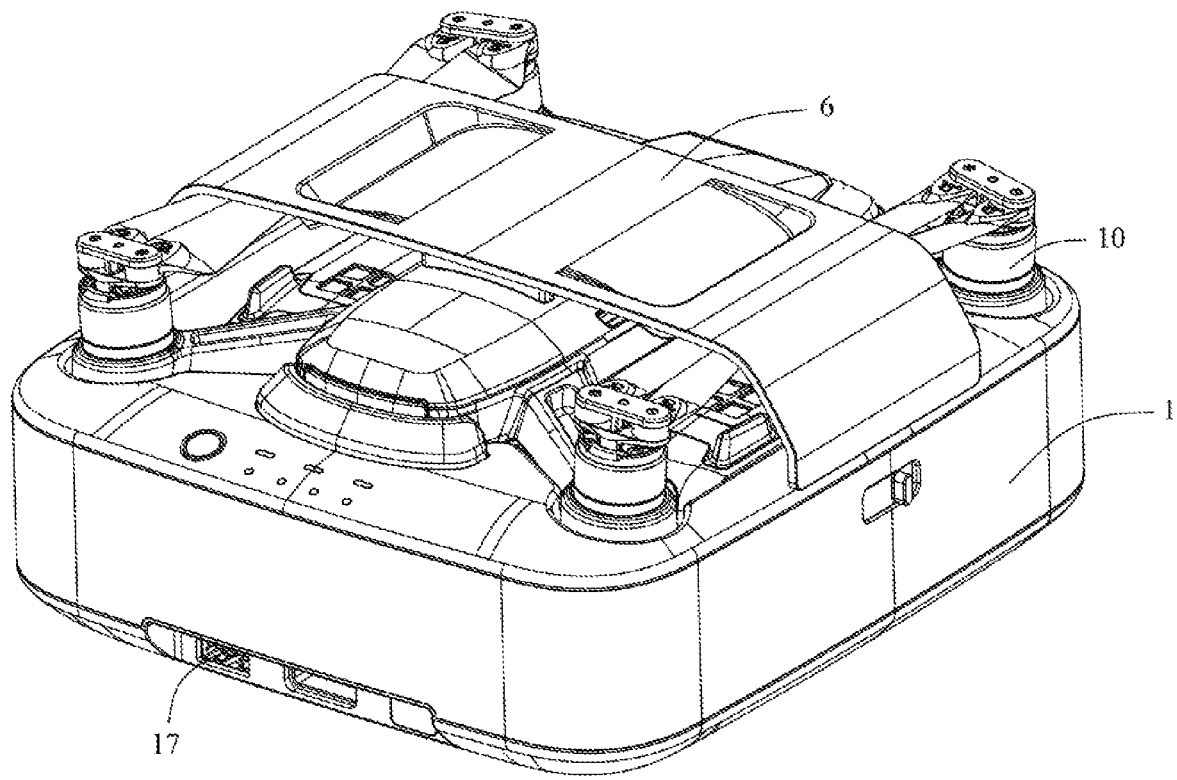
FIG. 5 is perspective view of a portable device for the UAV, according to an example embodiment.
Figure 6:
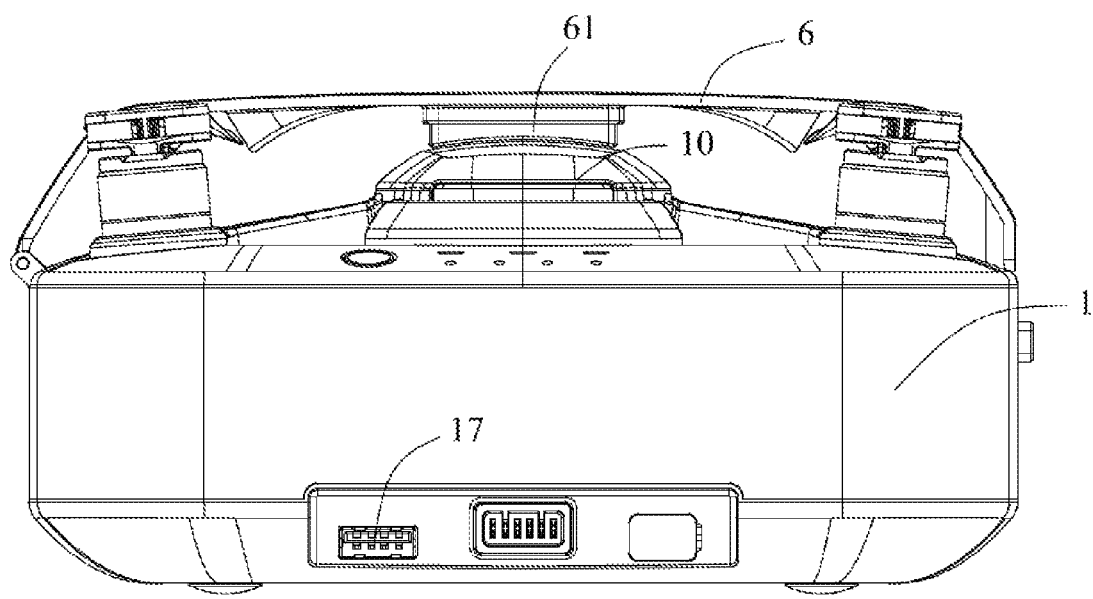
FIG. 6 is a side view of the portable device for the UAV, according to an example embodiment.

The charger of the present disclosure may be configured to receive, hold, or accommodate electronic devices and batteries of electronic devices. For example, the charger may be configured to hold a UAV and batteries of the UAV, a robot and batteries of the robot, etc. In the following descriptions, UAV is used as an example of the electronic device. As shown in FIG. 1 to FIG. 3, a charger 100 may include a charger body 1, a charging board 2, at least one first charging station 4, and at least one second charging station 5. The charging board 2 may be disposed in the charger body 1. The second charging station 5 may be disposed on the charger body 1. The first charging station 4 and the second charging station 5 may be electrically connected with the charging board 2, respectively. In some embodiments, the first charging station 4 may be configured to charge a UAV 10, and the second charging station 5 may be configured to charge a battery 20. Thus, the charge 100 includes not only the function of charging the battery 20, but also the function of charging the UAV 10. Accordingly, the functions of the charger 100 are expanded, which provides convenience to a user.

In some embodiments, the charger body 1 may be configured to hold the UAV 10. For example, the charger body 1 may include a first holding member 13 configured to have a shape matching the shape of the UAV 10. The first charging station 4 may be disposed in the first holding member 13. The first holding member 13 may be configured to hold parts of the UAV 10 that are susceptible to damage, thereby protecting the UAV 10. The disclosed charger 100 can not only charge the UAV 10, but also provides a carrier for storing the UAV 10, thereby protecting the UAV 10 from damages and making it easy to carry the UAV 10. In some embodiments, when other electronic devices are held in the first holding member 13, the shape of the first holding member 13 may be configured to match the shape of the other electronic devices.

In some embodiments, the first charging station 4 may be disposed in the first holding member 13, making it convenient to electrically connect the first charging station 4 with the UAV 10. When the UAV 10 is disposed in the first holding member 13, the charging contacts on the UAV 10 may be electrically connected with the first charging station 4. In some embodiments, the first charging station 4 may include charging contacts provided at the bottom portion of the first holding member 13, which are configured to electrically connect with the corresponding charging contacts of the UAV 10. The location and the structure of the first charging station 4 are not limited to these examples. For example, based on the distribution of the charging contacts on the UAV 10, the first charging station 4 may be disposed at any other suitable location in the first holding member 13. In some embodiments, the structure the first charging station 4 may include a plug or a socket.

In some embodiments, the charger body 1 may include a second holding member 14 configured to hold the battery 20. The second charging station 5 may be disposed in the second holding member 14. When the battery 20 is mounted to the second holding member 14, the charging contacts of the battery 20 may be electrically connected with the second charging station 5 disposed in the second holding member 14. In some embodiments, the second charging station 5 may include charging contacts disposed at a bottom portion and adjacent a side wall of the second holding member 14. The location and the structure of the second charging station 5 are not limited to these examples. For example, the location and the structure of the second charging station 5 may be configured to match or fit with the location and structure of the charging contacts of the battery 20.

In some embodiments, the first holding member 13 may include a first chamber 131 configured to hold a body 101 of the UAV 10, and a second chamber 132 configured to hold at least one wing 102 of the UAV 10. In some embodiments, there may be two second holding members 14, respectively disposed on two sides of the first chamber 131 of the first holding member 13. Such a configuration fully utilizes unused spaces of the charger 100. In addition, such a configuration enables the charger 100 to charge multiple batteries 20 simultaneously, thereby satisfying a larger demand on power from a user. The number of the first holding member 13 and the number of the second holding member 14 are not limited. Any suitable number of first holding members 13 and second holding members 14 may be included in the charger 100 based on the user's need. Accordingly, the charger 100 may charge multiple batteries 20 for the UAV simultaneously.

In some embodiments, two second chambers 132 may be disposed at any side of the first chamber 131. The second holding member 14 may be disposed in an area formed by the first chamber 131 and two second chambers 132 that are on the same side. Such a configuration of the first holding member 13 and the second holding member 14 is compact, thereby reducing the volume of the charger 100, which makes the charger 100 easy to carry and transport by the user.

In some embodiments, the charger body 1 may include a snap-fit member 15 disposed at each end of the first chamber 131. The UAV 10 may be snap-fit in the first holding member 13 by engaging with the two snap-fit members 15. In some embodiments, the snap-fit member 15 may include an elastic plastic part. The UAV 10 may be snap-fit in the first holding member 13 through the elasticity of the elastic plastic parts. In some embodiments, the snap-fit member 15 may include a structure having an elastic part engaged with a pulling rod. Through the elastic property of the elastic part, the pulling rod may lock the UAV 10 in the first holding member 13. In some embodiments, other fitting mechanisms and structures that may snap-fit the UAV 10 in the first holding member 13 may be included in the snap-fit member 15.

In some embodiments, the second chamber 132 may include an arm holding chamber 1321 and a motor holding chamber 1322. The arm holding chamber 1321 may be connected with the second holding member 14. In the present disclosure, the holding members may be configured to match the different structures or components of the UAV 10, thereby positioning and protecting the components of the UAV 10 located outside of the body 101 of the UAV 10. In some embodiments, a distance between a bottom portion of the arm holding chamber 1321 and a bottom portion of the second holding member 14 may be greater than or equal to a thickness of the battery 20. As such, the battery 20 may be located below the wing 102 of the UAV 10, thereby increasing the compactness of the configuration of the UAV 10 and the battery 20 on the charger 100. Space of the charger 100 may be fully utilized. In addition, the configuration may use the wing 102 of the UAV 10 to restrain the battery 20 from falling out of the second holding member 14.

In some embodiments, a depth of the second holding member 14 may be greater than a depth of the first chamber 131. Such a configuration positions the battery 20 under the wing 102, thereby increasing the utility rate of the space of the charger 100.

In some embodiments, the charger 100 may include a power supply 3 disposed in the charger body 1. The power supply 3 may be configured to electrically connect with the charging board 2 to provide an electric power to the charging board 2. By including the power supply 3 in the charger 100, a user may charge the UAV 10 or the battery 20 when the user is in an outdoor environment, thereby extending the continuous flight time of the UAV 10, and increasing the work efficiency when the user performs tasks in the outdoor environment using the UAV 10. In some embodiments, the charger 100 may be electrically connected with a power supply through a charging cable to charge the UAV 10 and the battery 20 directly.

In some embodiments, to charge the power supply 3, the charger 100 may include a charging interface 17 on the charger body 1. The charging interface 17 may be configured to electrically connect with the charging board 2. The charging board 2 may be configured to manage the power source distribution in the charger 100. When charging the power supply 3, a charging cable may connect an external power supply and the charging interface 17, thereby storing electrical charge (or electrical energy) into the power supply 3.

In some embodiments, the charging board 2 may play a significant role in intelligently managing the electrical charge in the charger 100. In some embodiments, the charging board 2 may include a controller and a detector connected with the controller. In some embodiments, based on a detection by the detector that the charger 100 is mounted with the UAV 10 and/or the battery 20, the controller may control the power supply 3 to charge the UAV 10 and/or the battery 20. In some embodiments, based on the electric charge of the power supply 3 as obtained by the controller and calculation performed by the controller, and based on a determination that the electric charge of the power supply 3 is sufficient to fully charge both of the UAV 10 and the battery 20, the controller may control the power supply 3 to charge the UAV 10 and the battery 20 simultaneously. In some embodiments, the detector may detect whether the UAV 10 and/or the battery 20 is mounted to the charger 100 by any suitable detecting methods, such as by detecting weight, by detecting a sensor output, or by detecting a light or a change in the light, etc.

In some embodiments, the controller may be configured to: based on a detection by the detector that the charger 100 is mounted with the UAV 10 and the battery 20, control the power supply 3 to charge the UAV 10 at a high priority. When the detector detects that the UAV 10 is fully charged, the controller may control the power supply 3 to charge the battery 20. In some embodiments, the controller may intelligently and selectively charge the UAV 10 and/or the battery 20 mounted to the charger 100. Because the UAV 10 is a device that the user uses for performing outdoor tasks, the controller may be configured to charge the UAV 10 at a higher priority.

In some embodiments, the charging board 2 may include a first determination processor connected with the controller and the detector. In some embodiments, based on a detection by the detector that the UAV 10 has been fully charged, and based on stored electric charges of the multiple batteries 20 as detected by the detector, the first determination processor may determine that the controller should charge a battery 20 having a relatively higher electric charge at a high priority. In some embodiments, after the UAV 10 is fully charged, the controller may select a first battery 20 having a relatively higher electric charge to receive charging at a high priority. After the first battery 20 is fully charged, the controller may select a second battery 20 from the remaining batteries that has a relatively higher electric charge to receive charging by the charger 100. This arrangement may enable the charger 100 to quickly and fully charge one of the batteries 20, so that the battery of the UAV 10 may be replaced in time for extending the continuous flight.

In some embodiments, the charging board 2 may include a second determination processor connected with the controller and the detector. In some embodiments, based on a detection by the detector that the UAV 10 and the battery 20 are mounted on the charger 100, and based on the stored electric charges of the UAV 10 and the battery 20, as detected by the detector, the second determination processor may determine that the controller should charge one of the UAV 10 and the battery 20 that has a relatively higher electric charge at a high priority. In some embodiments, the detector may detect a remaining electric charge in the power supply 3. Based on a determination that the remaining electric charge of the power supply 3 is insufficient to fully charge the UAV 10 or the battery 20, through a comparison performed by the second determination processor, the second determination processor may select one of the UAV 10 and the battery 20 that has a relatively higher remaining electric capacity to receive charging at a high priority. As such, the electric charge of each individual battery 20 (which may be a backup battery 20 or a battery 20 in the UAV 10) may be maintained as high as possible, thereby ensuring the continuous flight time provided by each individual battery 20 to the UAV 10.

In some embodiments, the charging board 2 may include a wireless communication device provided on the charging board 2. The wireless communication device may be configured to communicatively connect with a mobile terminal to enable a user to use the mobile terminal to monitor the operating status of the charger 100 and to control the controller to selectively charge the UAV 10 or the battery 20. The user may use the mobile terminal to communicatively connect with the charger 100 through the wireless communication device, thereby realizing remote monitoring of the operating status of the charger 100 and the charging priority relating to the charging by the charger 100. In some embodiments, the operating status of the charger 100 may include information relating to the storage of the electric charge in the power supply 3, information relating to the storage of the electric charge in the UAV 10 mounted on the charger 100, information relating to the storage of the electric charge in the battery 20 mounted on the UAV 10, and information relating to the charging performed by the charger 100, etc. The wireless communication device may include any suitable wireless communication device, such as, for example, at least one of a WiFi (Wireless-Fidelity) device, a Bluetooth device, or a Zigbee device.

In some embodiments, the charger 100 may include an adjustment key (not shown) configured to electrically connect with the charging board 2. The triggering of the adjustment key may control the order of priorities related to charging, by the charging board 2, the UAV 10 and the battery 20. The user may selectively trigger the adjustment key based on actual needs, to thereby select a priority for the UAV 10 or the battery 20 to receive charging.

In some embodiments, the charger 100 may include a switch key 16 configured to control the charging and discharging of the charger 100. In some embodiments, the charger 100 may include an indicator light 18 configured to indicate at least one of the electric charge stored in the charger or the operating status of the charger 100. In some embodiments, the electric charge of the charger 100 may include information relating to storage of the electric charge of the power supply 3, information relating to storage of the electric charge of the UAV 10, and/or information relating to storage of the electric charge of the battery 20. The operating status may include whether the charger 100 is charging the UAV 10 or the battery 20, or whether the charger 100 is charging both of the UAV 10 and the battery 20, etc.

In some embodiments, the charger body 1 may include an upper housing 11 and a lower housing 12 engagingly assembled together. The charging board 2 and the power supply 3 may be disposed in the space enclosed by the upper housing 11 and the lower housing 12. In some embodiments, the first holding member 13 and the second holding member 14 may be disposed on the upper housing 11. In some embodiments, the charging interface 17 may be disposed on the lower housing 12. The switch key 16 may be disposed on the upper housing 11.

As shown in FIG. 3 to FIG. 6, in some embodiments, the charger 100 may include a protective cover 6 mounted on the charger body 1 configured to protect the UAV 10 when the UAV 10 is mounted on the charger 100. The charger body 1 may include a connecting mechanism mounted to the protective cover 6. The protective cover 6 may be detachably mounted to the charger body 1 through the connecting mechanism. In some embodiments, the protective cover 6 may be mounted on the charger body 1 through a pivot connection.

In some embodiments, the connecting mechanism may include a hinge connection mechanism 111 disposed on a first side of the charger body 1, and a lock catch mechanism 112 disposed on a second side of the charger body 1. Correspondingly, the protective cover 6 may include a hinge connection part (not shown) configured to engage with the hinge connection mechanism 111 to pivotably rotate, and a lock stop part (not shown) configured to engage with the lock catch mechanism. The hinge connection part and the lock stop part may be disposed on two sides of the protective cover 6, respectively. In some embodiments, through the engagement between the hinge connection mechanism 111 and the hinge connection part, the protective cover 6 may pivotably rotate relative to the charger body 1. Through the engagement between the lock catch mechanism 112 and the lock stop part, the protective cover 6 may be secured on the charger body 1. In some embodiments, the lock catch mechanism 112 may include a structure that includes a snap hook engaging with a spring and a pressing button. In some embodiments, the lock stop part may include a snap-matching hook configured to engage with the snap hook. The locking of the lock stop part may be realized through the pressing button engaging with the spring and the snap hook. In some embodiments, the hinge connection mechanism 111 and the lock catch mechanism 112 may be disposed on the protective cover 6, and the hinge connection part and the lock stop part may be provided on the charger body 1.

In some embodiments, the protective cover 6 may include an abutting protrusion 61 disposed on a surface facing the first holding member 13. The abutting protrusion 61 may be configured to abut against the body 101 of the UAV 10 to ensure that the UAV 10 is positionally limited on the charger body 1, thereby make it convenient to carry and transport the charger 100.

In some embodiments, the protective cover 6 may include a solar panel (not shown). The solar panel may be configured to electrically connect with the charging board 2. In some embodiments, when there is no power supply to charge the charger 100 in an outdoor environment, the solar panel may convert the solar energy into electrical energy and charge the power supply 3 or directly charge the UAV 10 or the battery 20. The inclusion of the solar panel may fully utilize the natural resources, making it convenient to charge the charger 100. In some embodiments, an outer side surface of the charger 100 may include a solar panel. The solar panel may be configured to electrically connect with the charger board 2. The solar panel may convert the solar energy into electrical energy and may store the electrical energy in the charger 100, or may directly charge the UAV 10 and/or the battery 20.

The present disclosure adds novel and innovative functions and features to the basic function of the charger 100, i.e., charging the battery 20. The disclosed charger 100 may charge the UAV 10 simultaneously as the battery is charged, thereby making it more convenient for the user to charge the UAV 10. The charger 100 may include the first holding member 13 configured to match the shape of the UAV 10, thereby securing the UAV 10 on the charger 100. The charger 100 may be the carrier of the UAV 10, thereby providing protection to the UAV 10.

As shown in FIG. 1 to FIG. 6, in a second aspect, the present disclosure provides a portable device 100 (e.g., the charger 100 also functions as a portable device 100) for carrying the UAV, which may be configured to hold and carry the UAV 10. The portable device 100 for carrying UAV may include a body 1 for the portable device for carrying the UAV, a charging board 2, a first charging station 4, a second charging station 5, and a first holding member 13. The first holding member 13 may be configured to receive, hold, or accommodate the UAV 10, and may have a shape that matches the shape of the UAV 10. The charging board 2 may be disposed in the body 1 of the portable device for carrying the UAV. The first charging station 4 may be disposed in the first holding member 13, and may be configured to electrically connect with the charging board 2 to charge the UAV 10. The second charging station 5 may be disposed on the body 1 of the portable device for carrying the UAV 10, and may be configured to electrically connect with the charging board 2 for charging the battery 20. In some embodiments, the detailed structures of the portable device for carrying the UAV may refer to the descriptions of the charger 100.

In some embodiments, the body 1 of the portable device for carrying the UAV may include a second holding member 14 configured to receive, hold, or accommodate the battery 20. The second charging station 5 may be disposed in the second holding member 14. As such, after the battery 20 is mounted to the second holding member 14, the charging contacts of the battery 20 may be electrically connected with the second charging station 5 disposed in the second holding member 14. In some embodiments, the second charging station 5 may include charging contacts disposed at a bottom portion and adjacent a side wall of the second holding member 14.

In some embodiments, the first holding member 13 may include a first chamber 131 configured to receive, hold, or accommodate the body 101 of the UAV 10, and a second chamber 132 configured to receive, hold, or accommodate the wing 102 of the UAV 10. In some embodiments, there may be two second holding members 14, disposed on two sides of the first chamber 131 of the first holding member 13, respectively. Such a configuration may fully utilize unused space of the portable device 100, and may enable simultaneous charging of multiple batteries 20, thereby satisfying a larger demand from the user for electric power. In some embodiments, the numbers of the first holding members 13 and the second holding members 14 are not limited. Based on the user's need, the portable device 100 may include any suitable numbers of the first holding members 13 and the second holding members 14, thereby enabling simultaneous charging of multiple UAV 10 and multiple batteries 20.

In some embodiments, two second chambers 132 may be disposed at any side of the first chamber 131. The second holding member 14 may be disposed in an area formed by the first chamber 131 and two second chambers 132 disposed on the same side. Such a configuration of the first holding member 13 and the second holding member 14 is compact, thereby reducing the volume of the portable device 100, which makes the portable device 100 easy to carry and transport by the user.

In some embodiments, the body 1 of the portable device for carrying the UAV may include a snap-fit member 15 disposed on each end of the first chamber 131. The UAV 10 may be snap-fit in the first holding member 13 by engaging with the two snap-fit members 15. In some embodiments, the snap-fit member 15 may include an elastic plastic part. The UAV 10 may be snap-fit in the first holding member 13 through the elasticity of the elastic plastic parts. In some embodiments, the snap-fit member 15 may include a structure having an elastic part engaged with a pulling rod. Through the elastic property of the elastic part, the pulling rod may lock the UAV 10 in the first holding member 13. In some embodiments, other fitting mechanisms and structures that may snap-fit the UAV 10 in the first holding member 13, which may not be easily disengaged, may be included in the snap-fit member 15.

In some embodiments, the second chamber 132 may include an arm holding chamber 1321 and a motor holding chamber 1322. The arm holding chamber 1321 may be connected with the second holding member 14. In the present disclosure, the holding members may be configured to match with different structures or components of the UAV 10, thereby positioning and protecting the components of the UAV 10 located outside of the body 101 of the UAV 10. In some embodiments, a distance between a bottom portion of the arm holding chamber 1321 and a bottom portion of the second holding member 14 may be greater than or equal to a thickness of the battery 20. As such, the battery 20 may be located below the wing 102 of the UAV 10, thereby increasing the compactness of the configuration of the UAV 10 and the battery 20 mounted on the portable device 100. Space of the charger 100 may be fully utilized. In addition, the configuration may use the wing 102 of the UAV 10 to restrain the battery 20 from falling out of the second holding member 14.

In some embodiments, a depth of the second holding member 14 may be greater than a depth of the first chamber 131. Such a configuration makes the battery 20 to be located under the wing 102, thereby increasing the utility rate of the space of the portable device 100.

In some embodiments, the portable device 100 may include a power supply 3 disposed in the body 1 of the portable device for carrying the UAV. The power supply 3 may be configured to electrically connect with the charging board 2 to provide electric power to the charging board 2. By including the power supply 3 in the portable device 100, a user may charge the UAV 10 or the battery 20 when the user is in an outdoor environment, thereby extending the continuous flight time of the UAV 10, and increasing the work efficiency when the user performs tasks in the outdoor environment using the UAV 10. In some embodiments, the portable device 100 may be electrically connected with a power supply through a charging cable to charge the UAV 10 and the battery 20 directly.

In some embodiments, to charge the power supply 3, the portable device 100 may include a charging interface 17 on the body 1 of the portable device for carrying UAV. The charging interface 17 may be configured to electrically connect with the charging board 2. The charging board 2 may be configured to manage the power source distribution in the portable device 100. When charging the power supply 3, a charging cable may connect an external power supply and the charging interface 17, thereby storing electrical charge (or electric energy) into the power supply 3.

In some embodiments, the charging board 2 may play a significant role in intelligently managing the electrical charge in the portable device 100. In some embodiments, the charging board 2 may include a controller and a detector connected with the controller. In some embodiments, based on a detection by the detector that the portable device 100 is mounted with the UAV 10 and/or the battery 20, the controller may control the power supply 3 to charge the UAV 10 and/or the battery 20. In some embodiments, based on the electric charge of the power supply 3 as obtained by the controller and calculation performed by the controller, and based on a determination that the electric charge of the power supply 3 is sufficient to fully charge both of the UAV 10 and the battery 20, the controller may control the power supply 3 to charge the UAV 10 and the battery 20 simultaneously. In some embodiments, the detector may detect whether the UAV 10 and/or the battery 20 is mounted to the portable device 100 by any suitable detecting methods, such as by detecting weight, by detecting a sensor output, or by detecting a light or a change in the light, etc.

In some embodiments, based on a detection by the detector that the portable device 100 is mounted with the UAV 10 and the battery 20, the controller may be configured to control the power supply 3 to charge the UAV 10 at a high priority. When the detector detects that the UAV 10 is fully charged, the controller may control the power supply 3 to charge the battery 20. In some embodiments, the controller may intelligently and selectively charge the UAV 10 and/or the battery 20 mounted to the portable device 100. Because the UAV 10 is a device that the user uses for performing outdoor tasks, the controller may be configured to charge the UAV 10 at a higher priority than the battery.

In some embodiments, the charging board 2 may include a first determination processor connected with the controller and the detector. In some embodiments, when the detector detects that the UAV 10 has been fully charged, based on stored electric charges of the multiple batteries 20 as detected by the detector, the first determination processor may determine that the controller should charge a battery 20 having a relatively higher electric charge at a high priority. In some embodiments, after the UAV 10 is fully charged, the controller may select a first battery 20 having a relatively higher electric charge to receive charging at a high priority.

After the first battery 20 is fully charged, the controller may select a second battery 20 from the remaining batteries that has a relatively higher electric charge to receive charging by the portable device 100. This arrangement may enable the portable device 100 to quickly and fully charge one of the batteries 20, so that the battery of the UAV 10 may be replaced in time for extending the continuous flight.

In some embodiments, the charging board 2 may include a second determination processor connected with the controller and the detector. In some embodiments, when the detector detects that the portable device 100 is mounted with the UAV 10 and the battery 20, based on the stored electric charges of the UAV 10 and the battery 20, as detected by the detector, the second determination processor may determine that the controller should charge one of the UAV 10 and the battery 20 that has a relatively higher electric charge at a high priority. In some embodiments, the detector may detect a remaining electric charge in the power supply 3. Based on a determination that the remaining electric charge of the power supply 3 is insufficient to fully charge the UAV 10 or the battery 20, through a comparison performed by the second determination processor, the second determination processor may select one of the UAV 10 and the battery 20 that has a relatively higher remaining electric capacity to receive charging at a high priority. As such, the electric charge of each individual battery 20 (which may be a backup battery 20 or a battery 20 in the UAV 10) may be maintained as high as possible, thereby ensuring the continuous flight time provided by each individual battery 20 to the UAV 10.

In some embodiments, the charging board 2 may include a wireless communication device provided on the charging board 2. The wireless communication device may be configured to communicatively connect with a mobile terminal to enable a user to use the mobile terminal to monitor the operating status of the portable device 100 and to control the controller to selectively charge the UAV 10 or the battery 20. The user may use the mobile terminal to communicatively connect with the portable device 100 through the wireless communication device, thereby realizing remote monitoring of the operating status of the portable device 100 and the charging priority related to charging performed by the portable device 100. In some embodiments, the operating status of the portable device 100 may include information relating to the storage of the electric charge in the power supply 3, information relating to the storage of the electric charge in the UAV 10 mounted on the portable device 100, information relating to the storage of the electric charge in the battery 20 mounted on the UAV 10, and information relating to the charging performed by the portable device 100, etc. The wireless communication device may include any suitable wireless communication device, such as, for example, at least one of a WiFi (Wireless-Fidelity) device, a Bluetooth device, or a Zigbee device.

In some embodiments, the portable device 100 may include an adjustment key (not shown) configured to electrically connect with the charging board 2. The triggering of the adjustment key may control the order of priorities related to charging, by the charging board 2, the UAV 10 and the battery 20. The user may selectively trigger the adjustment key based on actual needs, to thereby select a priority for the UAV 10 or the battery 20 to receive charging.

In some embodiments, the portable device 100 may include a switch key 16 configured to control the charging and discharging of the portable device 100. In some embodiments, the portable device 100 may include an indicator light 18 configured to indicate at least one of the electric charge stored in the portable device 100 or the operating status of the portable device 100. In some embodiments, the electric charge of the portable device 100 may include information relating to storage of the electric charge of the power supply 3, information relating to storage of the electric charge of the UAV 10, and/or information relating to storage of the electric charge of the battery 20. The operating status may include whether the portable 100 is charging the UAV 10 or the battery 20, or whether the portable device 100 is charging both of the UAV 10 and the battery 20, etc.

In some embodiments, the body 1 of the portable device for carrying the UAV may include an upper housing 11 and a lower housing 12 engagingly assembled together. The charging board 2 and the power supply 3 may be disposed in the space enclosed by the upper housing 11 and the lower housing 12. In some embodiments, the first holding member 13 and the second holding member 14 may be disposed on the upper housing 11. In some embodiments, the charging interface 17 may be disposed on the lower housing 12. The switch key 16 may be disposed on the upper housing 11.

As shown in FIG. 3 to FIG. 6, in some embodiments, the portable device 100 may include a protective cover 6 mounted on the body 1 of the portable device configured to protect the UAV 10 mounted on the portable device 100. The body 1 of the portable device may include a connecting mechanism mounted to the protective cover 6. The protective cover 6 may be detachably mounted to the body 1 of the portable device through the connecting mechanism. In some embodiments, the protective cover 6 may be mounted on the body 1 of the portable device through a pivot connection.

In some embodiments, the connecting mechanism may include a hinge connection mechanism 111 disposed on a side of the body 1 of the portable device, and a lock catch mechanism 112 disposed on the other side of the body 1 of the portable device. Correspondingly, the protective cover 6 may include a hinge connection part (not shown) configured to engage with the hinge connection mechanism 111 to pivotably rotate, and a lock stop part (not shown) configured to engage with the lock catch mechanism. The hinge connection part and the lock stop part may be disposed on two sides of the protective cover 6, respectively. In some embodiments, through the engagement between the hinge connection mechanism 111 and the hinge connection part, the protective cover 6 may pivotably rotate relative to the body 1 of the portable device. Through the engagement between the lock catch mechanism 112 and the lock stop part, the protective cover 6 may be secured on the body 1 of the portable device. In some embodiments, the lock catch mechanism 112 may include a structure that includes a snap hook engaging with a spring and a pressing button. In some embodiments, the lock stop part may include a snap-matching hook configured to engage with the snap hook. The locking of the lock stop part may be realized through the pressing button engaging with the spring and the snap hook. In some embodiments, the hinge connection mechanism 111 and the lock catch mechanism 112 may be disposed on the protective cover 6, and the hinge connection part and the lock stop part may be provided on the body 1 of the portable device.

In some embodiments, the protective cover 6 may include an abutting protrusion 61 disposed on a surface facing the first holding member 13. The abutting protrusion 61 may be configured to abut against the body 101 of the UAV 10 to ensure that the UAV 10 is positionally limited on the body 1 of the portable device, thereby make it convenient to carry and transport the portable device 100.

In some embodiments, the protective cover 6 may include a solar panel (not shown). The solar panel may be configured to electrically connect with the charging board 2. In some embodiments, when there is no power supply to charge the portable device 100 in an outdoor environment, the solar panel may convert the solar energy into electrical energy and charge the power supply 3 or directly charge the UAV 10 or the battery 20. The inclusion of the solar panel may fully utilize the natural resources, making it convenient to charge the portable device 100. In some embodiments, an outer side surface of the portable device 100 may include a solar panel. The solar panel may be configured to electrically connect with the charger board 2. The solar panel may convert the solar energy into electrical energy and may store the electrical energy in the charger 100, or may directly charge the UAV 10 and/or the battery 20.

The present disclosure provides a charger and a portable device for carrying a UAV. The charger may include multiple charging stations configured to charge the UAV and the batteries. A first holding member that has a shape matching a shape of the UAV is provided on the charger body, such that the UAV may be mounted on the charger. This configuration may enhance the convenience of charging and carrying the UAV.

In the present disclosure, relational terms such as first and second, etc., are only used to distinguish an entity or operation from another entity or operation, and do not necessarily imply that there is an actual relationship or order between the entities or operations. Therefore, a "first" or "second" feature may include, explicitly or implicitly, one or more such features. The term "multiple" means two or more than two, unless otherwise defined.

The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

The above descriptions of various embodiments of the present disclosure are illustrative, and do not limit the scope of the present disclosure. A person having ordinary skills in the art can make changes, modifications, substitutions, and variations based on the present disclosure. The scope of the present disclosure is defined by the following claims and the equivalents.

What is claimed is:

1. A portable device for holding and carrying an unmanned aerial vehicle ("UAV"), comprising:
   a body comprising:
      a first holding member configured to hold the UAV and having a shape matching a shape of the UAV, the first holding member including a first chamber configured to hold a UAV body of the UAV, and at least one second chamber configured to hold a wing of the UAV; and
      at least one second holding member each configured to hold at least one battery and being disposed at a side of the first chamber;
   a charging board disposed in the body;
   a first charging station disposed in the first holding member and configured to electrically connect with the charging board for charging the UAV; and
   at least one second charging station each disposed in one of the at least one second holding member and configured to electrically connect with the charging board for charging the at least one battery.

2. The portable device of claim 1, wherein the least one second charging station comprises charging contacts disposed at a bottom portion of the at least one second holding member and adjacent to a side wall of the at least one second holding member.

3. The portable device of claim 1, wherein the at least one second holding member comprises two second holding members disposed at two sides of the first chamber of the first holding member, respectively.

4. The portable device of claim 1, wherein a depth of the at least one second holding member is greater than a depth of the first chamber.

5. The portable device of claim 1, wherein the body further comprises:
   two snap-fitting members respectively disposed at two ends of the first chamber,
   wherein the two snap-fitting members are configured to engage with the UAV to snap-fit the UAV in the first holding member.

6. The portable device of claim 1, wherein the at least one second chamber comprises two second chambers disposed at at least one side of the first chamber, and wherein the at least one second holding member is disposed in an area formed by the first chamber and the two second chambers disposed at the same side of the first chamber.

7. The portable device of claim 1,
   wherein the at least one second chamber comprises an arm holding chamber and a motor holding chamber, the arm holding chamber being connected with the at least one second holding member, and
   wherein a distance between a bottom portion of the arm holding chamber and a bottom portion of the at least one second holding member is greater than or equal to a thickness of the at least one battery.

8. The portable device of claim 1, further comprising:
   a power supply disposed in the body and configured to electrically connect with the charging board to supply electric power.

9. The portable device of claim 8, wherein the body further comprises:
   an upper housing and a lower housing configured to be engagingly assembled together,
   wherein the charging board and the power supply are disposed in a space enclosed by the upper housing and the lower housing, and
   wherein the first holding member and the at least one second holding member are disposed on the upper housing.

10. The portable device of claim 1, wherein the first charging station comprises charging contacts disposed at a bottom portion of the first holding member.

11. The portable device of claim 1, further comprising:
    a protective cover mounted to the body,
    wherein the body comprises a connecting mechanism mounted to the protective cover.

12. The portable device of claim 11,
    wherein the connecting mechanism comprises a hinge connection mechanism disposed on a first side of the body and a lock catch mechanism disposed on a second side of the body, and
    wherein the protective cover comprises a hinge connection part configured to engage with the hinge connection mechanism to pivotably rotate, and a lock stop part configured to engage with the lock catch mechanism.

13. The portable device of claim 11, wherein the protective cover comprises an abutting protrusion disposed on a surface of the protective cover facing the first holding member, the abutting protrusion configured to abut against the UAV body of the UAV.

14. The portable device of claim 11, wherein the protective cover comprises a solar panel.

15. The portable device of claim 1, further comprising a solar panel disposed on an outer side surface of the portable device.

16. The portable device of claim 1,
wherein the charging board comprises a controller and a detector connected with the controller, and
wherein the controller is configured to control a power supply to charge at least one of the UAV or the at least one battery in response to a detection by the detector that at least one of the UAV or the at least one battery is mounted to the portable device.

17. The portable device of claim 16, wherein the controller is configured to:
control the power supply to charge the UAV at a high priority in response to a detection by the detector that the UAV and the at least one battery are mounted to the portable device; and
control the power supply to charge the at least one battery in response to a detection by the detector that the UAV has been fully charged.

18. The portable device of claim 16,
wherein the at least one battery comprises a plurality of batteries,
wherein the charging board further comprises a determination processor connected with the controller and the detector, and
wherein the determination processor is configured to determine that the controller controls charging of one of the plurality of batteries having a relatively higher electric charge, in response to a detection by the detector that the UAV has been fully charged, and based on a detection by the detector of stored electric charges of the plurality of batteries.

19. The portable device of claim 16,
wherein the charging board further comprises a determination processor connected with the controller and the detector, and
wherein the determination processor is configured to determine that the controller controls charging of one of the UAV and the at least one battery having a relatively higher electric charge at a high priority, in response to a detection by the detector that the UAV and the at least one battery are mounted on the portable device, and based on a detection by the detector of stored electric charges of the UAV and the at least one battery.

20. The portable device of claim 1, wherein the charging board further comprises a wireless communication device configured to communicatively connect with a mobile terminal to enable a user to use the mobile terminal to remotely monitor an operating status of the portable device and to control the controller to charge at least one of the UAV or the at least one battery.

21. The portable device of claim 1, further comprising a switch key configured to control charging and discharging of the portable device.

22. The portable device of claim 1, further comprising an indicator light configured to indicate at least one of an electric charge stored in the portable device or an operating status of the portable device.

23. The portable device of claim 1, wherein:
the at least one second chamber includes a plurality of second chambers; and
the at least one second holding member includes a plurality of second holding members.

24. The portable device of claim 1, wherein:
the at least one second chamber includes two second chambers disposed at the side of the first chamber, the at least one second holding member being disposed at the side of the first chamber and between the two second chambers.

* * * * *